US009568911B2

(12) United States Patent
Groschen et al.

(10) Patent No.: US 9,568,911 B2
(45) Date of Patent: Feb. 14, 2017

(54) DYNAMIC MAINTENANCE SCHEDULING SYSTEM FOR SURFACE CLEANING MACHINES

(71) Applicant: Tennant Company, Minneapolis, MN (US)

(72) Inventors: Paul L. Groschen, White Bear Lake, MN (US); Robert J. Erko, Apple Valley, MN (US)

(73) Assignee: Tennant Company, Minneapolis, MN (US)

( * ) Notice: Subject to any disclaimer, the term of this patent is extended or adjusted under 35 U.S.C. 154(b) by 458 days.

(21) Appl. No.: 14/090,859

(22) Filed: Nov. 26, 2013

(65) Prior Publication Data

US 2014/0156035 A1 Jun. 5, 2014

Related U.S. Application Data

(60) Provisional application No. 61/731,703, filed on Nov. 30, 2012.

(51) Int. Cl.
| | | |
|---|---|---|
| *G05B 11/01* | (2006.01) | |
| *G05B 23/02* | (2006.01) | |
| *G06Q 10/00* | (2012.01) | |
| *G06Q 10/06* | (2012.01) | |

(52) U.S. Cl.
CPC ....... *G05B 23/0283* (2013.01); *G05B 23/0235* (2013.01); *G06Q 10/06312* (2013.01); *G06Q 10/20* (2013.01)

(58) Field of Classification Search
CPC . G05B 19/182; G05B 19/401; G05B 19/4099; G05B 2219/45147; Y10T 428/24479
See application file for complete search history.

(56) References Cited

U.S. PATENT DOCUMENTS

| | | | |
|---|---|---|---|
| 6,580,246 B2 | 6/2003 | Jacobs | |
| 7,199,711 B2 * | 4/2007 | Field | A47L 11/4011 15/319 |
| 2003/0030399 A1 | 2/2003 | Jacobs | |
| 2003/0101262 A1 * | 5/2003 | Godwin | G06Q 10/06 709/224 |
| 2006/0103523 A1 | 5/2006 | Field | |
| 2008/0147264 A1 | 6/2008 | Doulatshahi et al. | |
| 2008/0172281 A1 | 7/2008 | Probst | |
| 2009/0037206 A1 | 2/2009 | Byrne et al. | |

(Continued)

FOREIGN PATENT DOCUMENTS

| | | |
|---|---|---|
| CN | 1434395 A | 8/2003 |
| CN | 1795134 A | 6/2006 |

(Continued)

OTHER PUBLICATIONS

International Search Report and Written Opinion for PCT/US2013/072228, date of mailing Jan. 27, 2015, 14 pages.

(Continued)

*Primary Examiner* — Carlos Ortiz Rodriguez
(74) *Attorney, Agent, or Firm* — Fredrikson & Byron, P.A.

(57) ABSTRACT

An automatic and dynamic maintenance scheduling system for surface cleaning machines. Based on the receipt or lack of receipt of machine usage data from the machine, the system will adjust or maintain scheduled service call dates.

26 Claims, 5 Drawing Sheets

(56) References Cited

U.S. PATENT DOCUMENTS

2011/0077802 A1    3/2011   Halloran et al.
2012/0154116 A1    6/2012   Duenne

FOREIGN PATENT DOCUMENTS

| CN | 101753364 A | 6/2010 |
|----|-------------|--------|
| CN | 101969388 A | 2/2011 |
| JP | 2006160505 A | 6/2006 |
| KR | 20060078099 A | 7/2006 |
| KR | 100821162 B1 | 4/2008 |
| WO | 2007065031 A2 | 6/2007 |

OTHER PUBLICATIONS

European Search Report for EP Application No. 13803409.5, 13 pages, date of mailing: Aug. 12, 2016.

* cited by examiner

DYNAMIC MAINTENANCE SCHEDULING SYSTEM FOR SURFACE CLEANING MACHINES

FIELD

The present invention generally relates to an automatic and dynamic maintenance scheduling system for surface cleaning machines.

BACKGROUND

Surface cleaning machines are well known. These machines may be self-powered, towed, or pushed, and/or manually powered and may carry a human operator during cleaning operations. Such machines include scrubbers, extractors, sweepers and vacuums, as well as combinations thereof, intended for cleaning, scrubbing, wiping and/or drying a portion of a substantially flat surface both indoors and outdoors. These devices typically include a source of cleaning solution, solution applying means for distributing cleaning solution onto the floor surface, scrubbing means for engaging a wetted floor surface and a vacuum system for removing soiled cleaning solution from the floor surface. The cleaning solution is typically supplied to the floor surface through or near rotary scrub brushes operating from a lower portion of the machines.

One of the costs for owning surface cleaning machines is costs for maintenance services, such as oil changes, fluid replacement or other services that allow the machines to perform better and last longer. Machine owners typically keep a fleet of surface cleaning machines at different onsite locations. A service technician typically travels from offsite to perform maintenance services onsite since it is often too difficult to transport surface cleaning machines to and from an offsite service center.

In some cases, when a machine owner determines that a machine needs service, the owner contacts an offsite service center, which then schedules an onsite service call. Sometimes, an undesirable period of time lapses between the time the owner determines that service is needed and the time the onsite service call actually occurs. This causes unwanted machine downtime that can be costly.

In other cases, an owner schedules an onsite service call for a future date. The owner picks a future date by estimating when service will be needed based on predicted machine usage. However, sometimes, the machine is used more than was anticipated and needs service earlier than the prescheduled date. An owner must then reschedule the service call for an earlier date, if possible, or suspend operation of the machine until the service call takes place. Other times, the machine is used less than was anticipated and does not need service by the prescheduled date. The owner can simply keep the prescheduled service call, thereby incurring the wasteful costs of the service when it was not needed, or reschedule the service call. However, since owners often keep a fleet of service maintenance machines, they can have difficulty in keeping track of the maintenance each machine needs. As a result, service calls often take place too early or too late. Thus, it would be desirable to facilitate scheduling of onsite maintenance service call dates for surface cleaning machines.

SUMMARY

The present invention seeks to facilitate scheduling of onsite maintenance service call dates for surface cleaning machines. In certain embodiments, the present invention provides a dynamic maintenance scheduling system for surface cleaning machines.

Certain embodiments of the invention include a dynamic machine maintenance scheduling system that includes a surface maintenance machine, that supports a central data unit (CDU), and an offsite computer. On an automatic, recurring basis, the CDU may transmit, to the offsite computer, machine usage data that the CDU has collected. The offsite computer may prompt the CDU to transmit such machine usage data. If the offsite computer receives the CDU's machine usage data, the offsite computer automatically reschedules an onsite machine service call date when the machine usage data meets a rescheduling criteria. If the offsite computer receives the CDU's machine usage data, the offsite computer automatically keeps a previously scheduled onsite machine service call date when the machine usage data fails to meet a rescheduling criteria. If the offsite computer fails to receive machine usage data from the CDU, the offsite computer automatically keeps the previously scheduled onsite machine service call date.

In certain embodiments of the dynamic machine maintenance scheduling system, the rescheduling criteria are met when a calculated date differs from the scheduled onsite machine service call date by a threshold amount. The calculated date is a projection of when the machine will reach a threshold number of usage hours based on the machine usage data.

BRIEF DESCRIPTION OF THE DRAWINGS

The following drawings are illustrative of particular embodiments of the invention and therefore do not limit the scope of the invention. The drawings are not to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

For the purpose of promoting an understanding of the principles of the invention, reference will now be made to the embodiments illustrated in the drawing and specific language will be used to describe the same. It will, nevertheless, be understood that no limitation of the scope of the invention is thereby intended; any alterations and further modifications of the described or illustrated embodiments, and any further applications of the principles of the invention as illustrated therein, are contemplated as would normally occur to one skilled in the art to which the invention relates.

Figure 1:
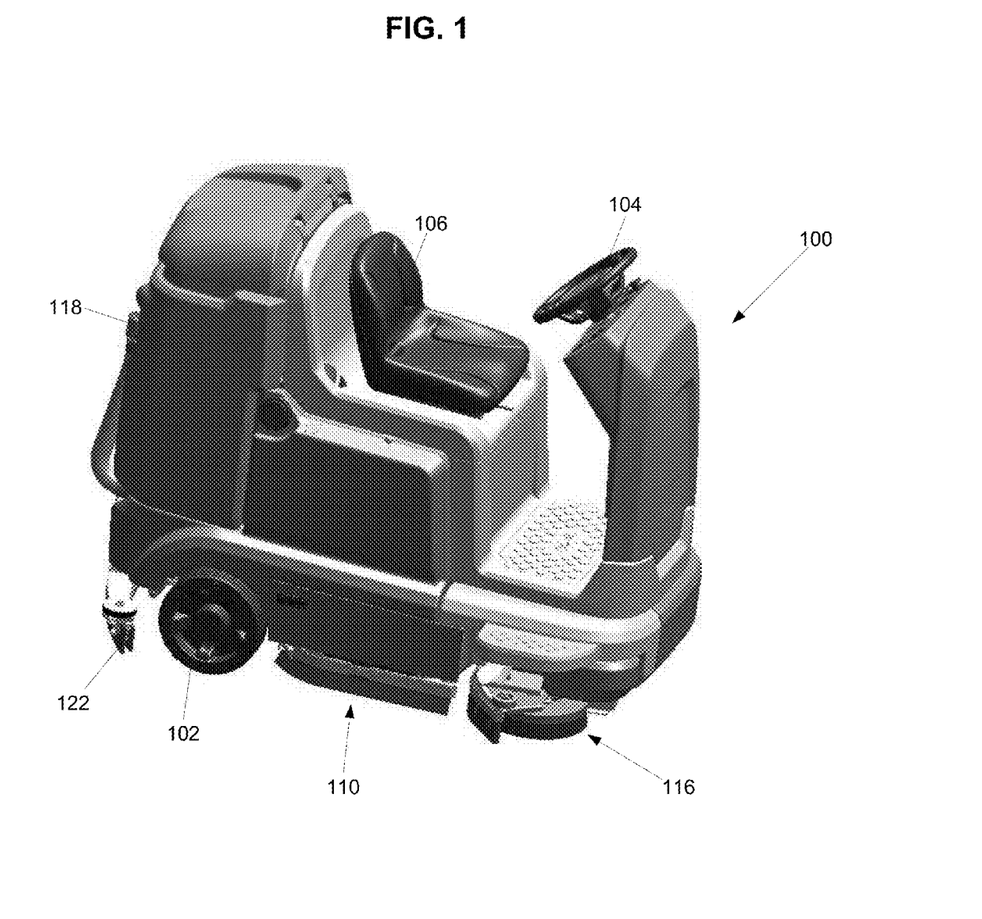
FIG. 1 is an upper perspective view of an exemplary floor surface cleaning machine employing an embodiment of a dynamic maintenance scheduling system of the present invention.
Figure 2:
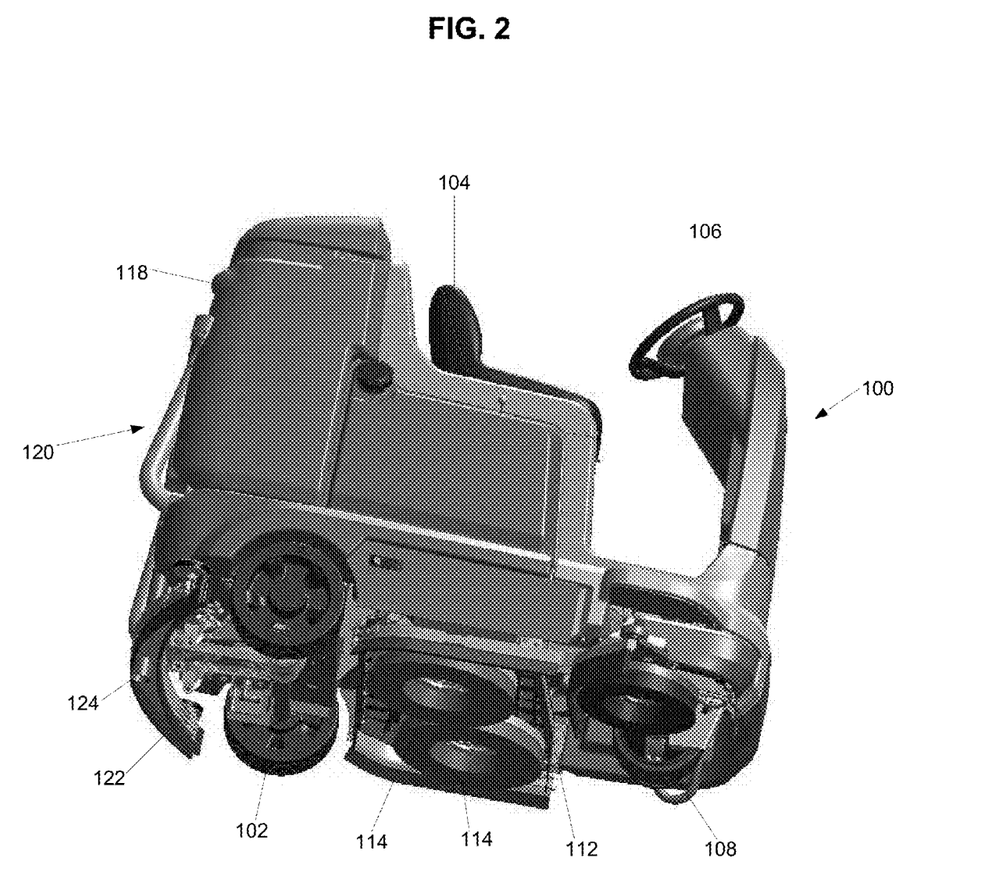
FIG. 2 is a lower perspective view of an exemplary floor surface cleaning machine employing an embodiment of a dynamic maintenance scheduling system of the present invention.

FIGS. 1 and 2 are upper and lower perspective views, respectively, of an exemplary floor surface cleaning machine 100 that employs a dynamic maintenance scheduling system. Embodiments of the machine 100 include components that are supported on a motorized mobile body. The mobile body comprises a frame supported on wheels 102 for travel over a surface, on which a cleaning operation is to be performed. The mobile body includes operator controls and a steering wheel 104, which is positioned with respect to a seat 106 of machine 100, so that a seated operator of machine 100 may steer a front center wheel 108 of machine 100. The machine 100 is preferably powered by one or more batteries that may be contained in a compartment beneath the seat. Alternately, the power source may be an internal combustion engine, powered through an electrical cord, or one or more power cells, may be employed to power the machine 100.

Cleaning components extend from an underside of the machine 100. For example, a scrub head 110 is shown located at a middle portion of machine 100. The scrub head 110 has a housing 112 that encloses two scrub brushes 114. The brushes 114 are driven by two electric motors. An electric actuator attached between the scrub head 110 and the housing 112 raises the scrub head 110 for transport, lowers it for work, and controls its down pressure on the floor. The scrub head 110 uses two disk scrub brushes 114 rotating about parallel vertical axes. Alternatively, the scrub heads may be made with only one disk scrub brush, or one or more cylindrical brushes rotating about horizontal axes. While a scrub head 110 is depicted in the drawing figures, any appliance or tool for providing surface maintenance, surface conditioning, and/or surface cleaning to a surface may be coupled to an associated machine in accordance with the present invention.

The machines 100 can include a side brush assembly generally indicated as 116 for cleaning a larger floor envelope. Such side brush assemblies make it easier to clean near walls or other obstacles without damaging the machine or the wall while at the same time widening the cleaning path of the machine to increase productivity. The side brush assembly is mounted on the front, right side of the machine 100 and swings outwardly away from the machine center and downwardly toward the surface to be cleaned.

During wet scrubbing operations, water or a cleaning liquid contained in a tank 118 is sprayed to the surface beneath the machine 100, in proximity to the scrub head 110. Brushes 114 scrub the surface and the soiled cleaning liquid is then collected by a fluid recovery system and deposited in a waste recovery tank 120. One embodiment of the fluid recovery system of the machine 100 includes a vacuum squeegee mounted adjacent the rear end of the machine 100. The vacuum squeegee generally comprises a squeegee 122 that extends across the width of the machine 100 and a frame that supports the squeegee 122. The vacuum squeegee also includes a vacuum port 124 that is placed in vacuum communication with a vacuum fan. The vacuum fan operates to remove liquid and particle waste collected by the vacuum squeegee 122 for deposit in the waste recovery tank 120.

In alternate embodiments, the surface maintenance machine 100 may be a combination of sweeper and scrubber machines. In such embodiments, in addition to the elements describe above, the machine 100 may also include sweeping brushes and a hopper extending from the underside of the machine 100, with the sweeping brushes designed to direct dirt and debris into the hopper. In still other embodiments, the machine 100 may be a sweeper only. In such embodiments, the machine 100 may include the elements as described above for a sweeper and scrubber machine, but would not include the scrubbing elements such as scrubbers, squeegees and fluid storage tanks (for detergent, recovered fluid and clean water). Alternatively, the machine 100 may be designed for use by an operator that walks behind the machine, or the machine may be configured to be towed behind a vehicle.

Figure 3:
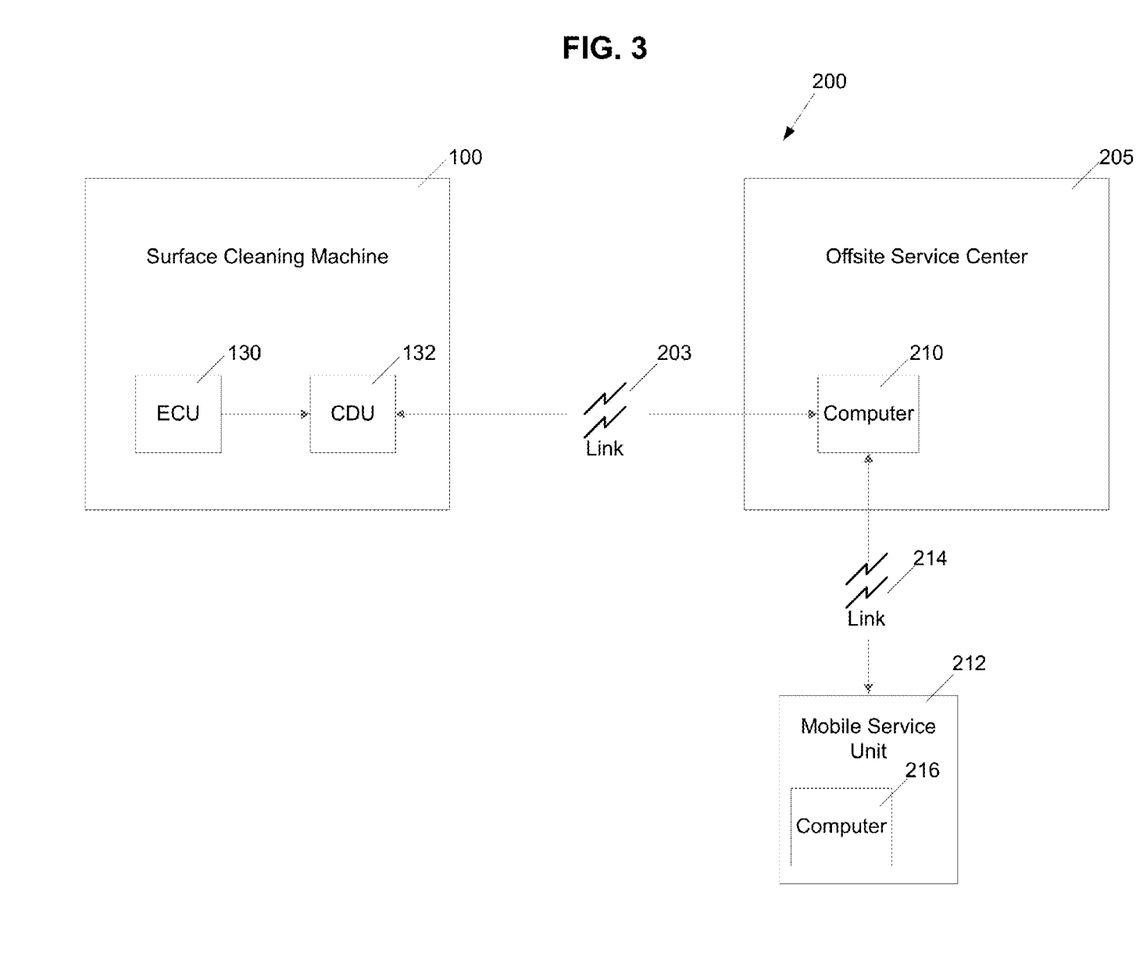
FIG. 3 is a chart showing certain basic components for an embodiment of a dynamic maintenance scheduling system of the present invention.

FIG. 3 illustrates certain basic components for an embodiment of a dynamic maintenance scheduling system 200 of the present invention. The system 200 includes a surface cleaning machine 100, an offsite service center (OSC) 205 and mobile service unit 212. The mobile service unit 212 may be stationed at the OSC 205 or other location remote from the location of the surface cleaning machine 100. The mobile service unit 212 may be dispatched to the location of the surface cleaning machine 100. The surface cleaning machine 100 can be according to any of the embodiments described above and further includes an engine control unit or electronic control unit (ECU) 130 and a central data unit (CDU) 132. The OSC 205 includes a computer 210 and the mobile service unit 212 also includes a computer 216.

The ECU 130 monitors machine usage data and any machine error data. The ECU 130 can be any electronic system known in the art that has machine diagnostic and monitoring capabilities. Typically, the ECU 120 will be an electronic system that monitors one or more sensors in the machine and may comprise one or more processors and one or more memory modules. In some embodiments, the one or more processors may be configured to execute instructions contained in the one or more memory modules. The sensors can be located at different positions in the machine and collect machine usage data and machine error data. In some embodiments, the ECU connects to sensors and other peripheral devices through a controller area network (CAN) bus. ECUs are well-known devices for managing engine functionality, such as fuel and ignition, and can often generate trouble codes in the event of engine troubles.

The ECU 130 provides the machine usage data and the machine error data to the CDU 132. The ECU 130 output may be provided automatically, periodically, or based on a query from the CDU 132. The CDU 132 can be any central data computing system known in the art and may comprise one or more processors and one or more memory modules. In certain embodiments, the CDU 132 may include one or more communication modules configured to connect the CDU 132 to the ECU 130. In some embodiments, the one or more communication modules may be configured to connect via a CAN bus (e.g, via a J1939 standard). The one or more communication modules may be configured to communicate via any wired or wireless link, however. In certain embodiments, the communication modules may comprise a microcontroller along with interfaces, including a CAN bus and other communication circuitry (e.g., modem). The CDU 132 also stores machine identification data, for example, in the one or more memory modules. The communication modules of the CDU 132 can also be configured to communicate with the OSC computer 210 using a communication link 203. The communication link 203 can be any type of communication link known in the art and is preferably a wireless communication link. In certain embodiments, the communication link 203 is a data connection over a cellular phone network. The communication link 203 may employ many types of wireless communication, including Wi-Fi, CDMA, GPRS, 3G, 4G, Bluetooth, Zigbee, etc.

On a periodic basis, the OSC computer 210 queries and the CDU 132 transmits the machine usage data and any machine error data to the OSC computer 210 through the communication link 203. In some cases, the CDU 132 transmits machine identification data to the OSC computer 210.

As used herein, the term "machine usage data" includes but is not limited to number of hours the machine is turned on, number of hours the machine actually cleans and/or number of miles the machine has traveled. Also, as used herein, the term "machine error data" includes but is not limited to machine operation errors, machine electronic errors including predictive diagnostics (e.g., future failures of systems or components), machine accidents, fluid and oil level insufficiencies, calibration errors, filter failures, low battery fluid and/or capacity levels, and/or low tire pressures. Finally, as used herein, the term "machine identification data" includes but is not limited to vehicle VIN number, machine model information, machine manufacture year, machine purchase date, and/or machine location.

The OSC computer 210 uses the machine usage data and any machine error data to automatically and dynamically schedule an onsite machine service call, as will be further explained below, and to dispatch a mobile service unit 212 to conduct the onsite machine service call. The OSC computer 210 may comprise one or more programmable processors, one or more memory modules, and one or more communication modules. In certain embodiments, the OSC computer 210 includes a database. The database may be stored in one or more computer-readable memory modules, and may be housed within or in communication with, one or more computers. In some embodiments, the database may include information about fleets of vehicles that it services, such as those including surface cleaning machine 100. The information about fleets of vehicles may be cross-referenced with machine identification data. Thus, given the machine identification data from machine 100 as an index, the OSC computer 210 database may retrieve further information about machine 100, such as its location, its owner or lessee, past machine usage data, past machine error data, service history, and the like. The one or more communication modules of the OSC computer 210 may be configured to be in communication with the mobile service unit computer 212 using another communication link 214. Again, the communication link 214 can be any type of communication link known in the art and is preferably a wireless communication link, such as a data link over a cellular telephone network or a Wi-Fi link connected to an internet hotspot. The mobile service unit 212 can be a service vehicle, service technician, and the like. In some cases, the mobile service unit computer 216 is a computer that is housed by a service vehicle. In other cases, the mobile service unit computer 216 is a portable computer that is carried by service technician. In some embodiments, the mobile service unit computer 216 may comprise one or more processors, one or more memory modules, and/or one or more memory modules. The OSC computer 210 transmits service call data to the mobile service unit computer 216.

Figure 4:
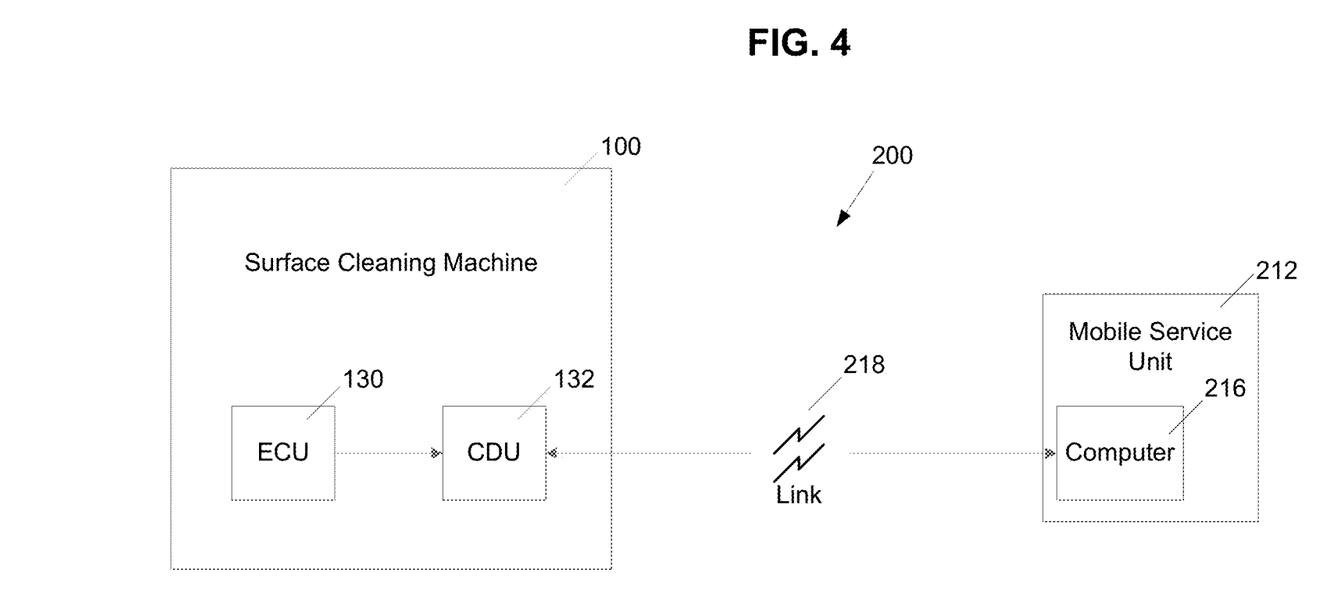
FIG. 4 is a chart showing another arrangement of certain basic components for an embodiment of a dynamic maintenance scheduling system of the present invention.

FIG. 4 illustrates another arrangement of basic components for another embodiment of a dynamic scheduling system 200. In FIG. 3, the CDU 132 communicates with an OSC computer 210, which in turn communicates with a mobile service unit computer 216. However, in FIG. 4, the CDU 132 instead communicates directly with the mobile service unit computer 216. In this embodiment, the offsite service center 205 is optional.

Figure 5:
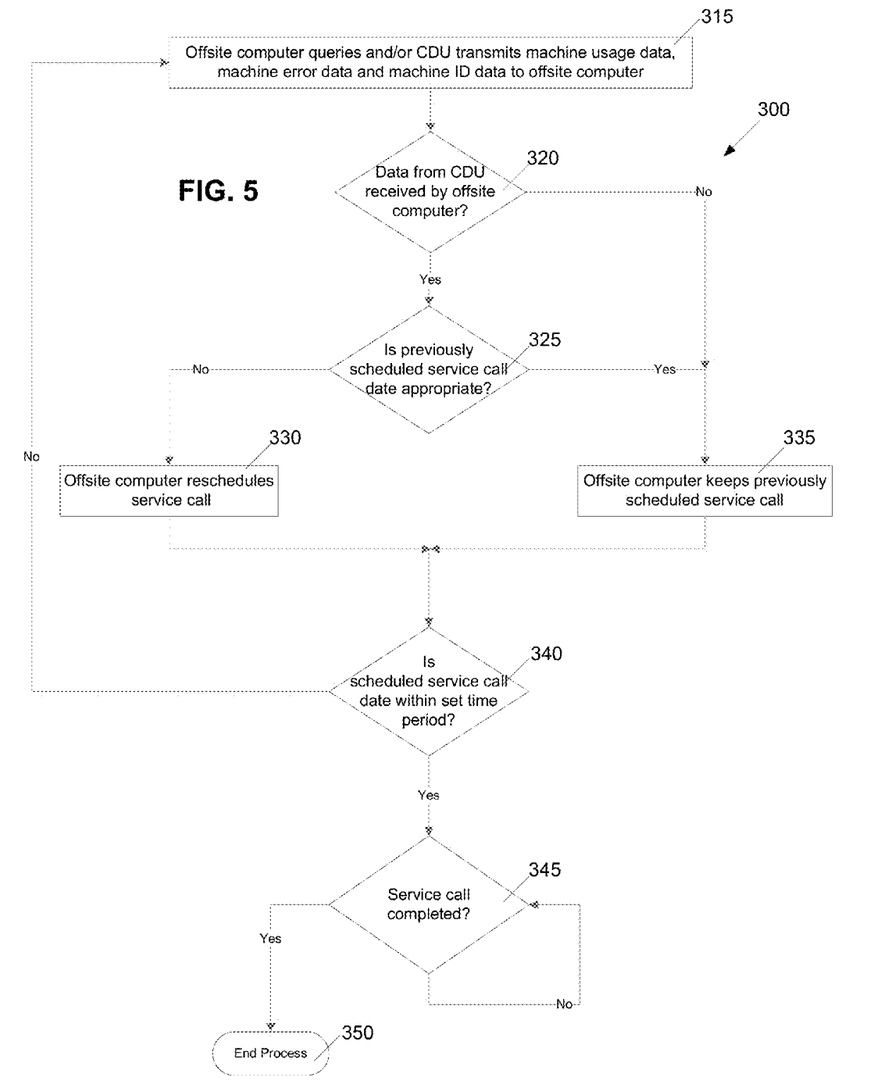
FIG. 5 is a flow chart showing an operation mechanism for an embodiment of a dynamic maintenance scheduling system of the present invention.

FIG. 5 illustrates an operational process 300 for an embodiment of a dynamic maintenance scheduling system of the present invention. The system of either FIG. 3 or FIG. 4 can be used to carry out the operational process depicted in FIG. 5. In FIG. 5, reference is made to an offsite computer, which can be the OSC computer 210 and/or the mobile service unit computer 216. In certain embodiments, the offsite computer (OSC computer 210 and/or the MSU computer 216) maintains an electronic calendar of scheduled onsite machine service call dates.

In this operational process, the CDU 132 receives machine usage data and any machine error data from the ECU 130. The transfer of data between the CDU 132 and the ECU 130, as noted above, may be automatic, periodic, and/or on-demand. The CDU 132 also stores machine identification data in certain embodiments. In step 315, an offsite computer (for example, the OSC computer 210 and/or the MSU computer 216) queries the CDU 132 on a periodic basis and prompts the CDU 132 to transmit the machine usage data, any machine error data and any machine identification data to the offsite computer. In certain embodiments, in step 315, the CDU 132 transmits the machine usage data, any machine error data and any machine identification data to the offsite computer automatically, periodically, and/or in response to a query from the offsite computer.

The offsite computer uses all of the received data to automatically and dynamically schedule or adjust the schedule of an onsite machine service call date, and possibly adjust up to all of the scheduled onsite machine service call dates. At step 320, the offsite computer first determines whether it has in fact received data from the CDU 132. In certain scenarios, a CDU 132 will fail to transmit data and/or the offsite computer will fail to receive data from the CDU 132. For instance, machine 100 may be in a location or in an operational condition that does not permit communication. If the offsite computer has not received data, it automatically keeps a previously scheduled service call date at step 335, and possibly keeps up to all previously scheduled service call dates in the same step.

The previously scheduled service call date can be a date that was previously scheduled using machine identification data. In some cases, when an owner purchases a machine 100, the owner registers the machine 100. The offsite computer then stores the registration information as machine identification data. Also, in some embodiments, the CDU 132 also transmits machine identification data to the offsite computer. In such cases, the previously scheduled service call date can be an anniversary date that is generated using the machine identification data. For example, the anniversary date can be an anniversary date of the machine purchase date or an anniversary date of the machine manufacture date, such as the 3 month date, the 6 month date or the 1 year date. In other cases, the previously scheduled service call date is simply a date the offsite computer most recently scheduled using the dynamic scheduling system before the CDU 132 failed to transmit data.

Referring back to step 320, if the offsite computer does receive data from the CDU 132, the offsite computer at step 325 uses that data to determine whether the previously scheduled service call date is set for an appropriate date. Typically, the offsite computer compares the machine usage data against a rescheduling criteria or set of rules to determine whether the previously scheduled service call date is appropriate. Generally, if the rescheduling criteria are met, the previously scheduled service call date is considered inappropriate. If the rescheduling criteria are not met, the previously scheduled service call date is appropriate and, possibly, all of the previously scheduled call dates are appropriate and may be maintained as scheduled.

In some cases, the offsite computer considers the rescheduling criteria to be met when a threshold change occurs in the machine usage data, such as a threshold increase or a threshold decrease in average machine usage hours per day or per week or per month (e.g., meets a threshold rate of change). In other cases, the offsite computer considers the rescheduling criteria to be met when the machine usage data meets a set usage threshold, such as a threshold number of machine usage hours. In certain embodiments, the offsite computer uses the machine usage data to calculate a date when a threshold number of usage hours will occur. To the extent the calculated date is before or after the next scheduled service date, for instance by more than a threshold amount of time, the offsite computer the offsite computer considers the rescheduling criteria to be met and adjusts or reschedules the scheduled service date closer to the calculated date.

As explained above, in some cases, the CDU 132 also transmits machine error data to the offsite computer in some embodiments. In such cases, the offsite computer also compares the machine error data received against rescheduling criteria. In one example, the offsite computer uses the machine error data to determine whether the machine error is urgent or non-urgent. If the machine error is urgent, the rescheduling criteria are met. If the machine error is not urgent, the rescheduling criteria are not met. A machine error is considered "urgent" if the machine is unable to continue to operate (e.g., cannot operate, cannot operate safely, can operate but damage would occur) until the previously scheduled service call is scheduled to occur and is considered "non-urgent" if the machine can continue to operate until the previously scheduled service call date is scheduled to occur.

If the rescheduling criteria are met (e.g., the calculated date, as described above, differs from the current scheduled date beyond a threshold amount), the date at step 325 is considered to be inappropriate. The offsite computer then reschedules the service call date at step 330. In certain embodiments, the offside computer reschedules or adjusts more than one scheduled service call date when the rescheduling criteria are met. If the rescheduling criteria are not met, the date is considered to be appropriate. The offsite computer then keeps the previously scheduled service call at step 335, and potentially, maintains up to all of the previously scheduled service calls. In cases where the offsite computer reschedules the service call at step 330, the offsite computer can also use the machine usage data and/or machine error data to determine when to reschedule the service call. Generally, the offsite computer will reschedule a service call at an earlier date if the machine usage data shows a higher than expected machine usage or the machine error data shows an urgent error. Likewise, the offsite computer will reschedule a service call at a later date of the machine usage data shows a lower than expected machine usage and no machine error data is received.

Once the offsite computer either reschedules the service call at step 330 or keeps the previously scheduled service call at step 335, the offsite computer then determines whether the scheduled service call is scheduled to take place very soon, such as within a set time period. The set time period can be a time period such as within 3 months, within 1 month, within 2 weeks or perhaps within 1 week. If the service call is not scheduled to take place within the set time period, the offsite computer prompts the process to start over again at step 315. However, if the service call is scheduled to take place within the set time period, the offsite computer next determines whether the service call has been completed at step 345. The offsite computer continues to ask whether the service call is completed until it is in fact completed at the end step 350.

In certain embodiments, the offsite computer stores machine identification data. The offsite computer can also use the machine identification data to determine the location of the machine and to automatically schedule the location of an onsite machine service call. Likewise, the offsite computer can also use the machine identification data to automatically schedule the type of machine service needed during the on-site machine service call.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a non-transitory computer-readable medium, such as a computer-readable storage medium, containing instructions. Instructions embedded or encoded in a computer-readable storage medium may cause a programmable processor, or other processor, to perform the method, e.g., when the instructions are executed. Non-transitory computer readable storage media may include volatile and/or non-volatile memory forms including, e.g., random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

The invention claimed is:

1. A dynamic machine maintenance scheduling system comprising:

a mobile surface maintenance machine supporting a central data unit (CDU) comprising one or more programmable processors, wherein the one or more programmable processors of the CDU are adapted to collect machine usage data from the machine, the machine usage data corresponding to at least an amount of time of surface maintenance performed by the surface maintenance machine; and an offsite computer comprising one or more programmable processors;

wherein the one or more programmable processors of the CDU and the one or more programmable processors of the offsite computer are adapted to execute instructions to cause, on an automatic, recurring basis, at least one of
i. the offsite computer to prompt the CDU to transmit the machine usage data to the offsite computer, and
ii. the CDU to transmit the machine usage data to the offsite computer;

the offsite computer being adapted to determine whether the offsite computer has failed to receive machine usage data, when the offsite computer determines that it received machine usage data from the CDU, the one or more processors of the offsite computer are adapted to automatically reschedule an onsite machine service call date when the machine usage data meets a rescheduling criteria or automatically keeps a previously scheduled onsite machine service call date when the machine usage data fails to meet the rescheduling criteria; and when the offsite computer determines that it failed to receive machine usage data from the CDU, the one or more processors of the offsite computer are adapted to automatically keep the previously scheduled onsite machine service call date.

2. The dynamic machine maintenance scheduling system of claim 1, wherein if the offsite computer receives machine usage data from the CDU, the one or more processors of the offsite computer are adapted to automatically adjust all onsite machine service call dates when the machine usage data meets the rescheduling criteria.

3. The dynamic machine maintenance scheduling system of claim 1, wherein if the offsite computer receives machine usage data from the CDU, the one or more processors of the offsite computer are adapted to automatically maintain all previously scheduled onsite machine service call dates when the machine usage data fails to meet the rescheduling criteria.

4. The dynamic machine maintenance scheduling system of claim 1, wherein if the offsite computer fails to receive machine usage data from the CDU, the one or more processors of the offsite computer are adapted to automatically maintain all previously scheduled onsite machine service call dates.

5. The dynamic machine maintenance scheduling system of claim 1, wherein the rescheduling criteria is met when a threshold change occurs in the machine usage data.

6. The dynamic machine maintenance scheduling system of claim 5, wherein the threshold change is a threshold increase or threshold decrease in average machine usage hours per week or per month.

7. The dynamic machine maintenance scheduling system of claim 1, wherein the rescheduling criteria is met when a calculated date differs from the scheduled onsite machine service call date by a threshold amount, the calculated date being a projection of when the machine will reach a threshold number of usage hours based on the machine usage data.

8. The dynamic machine maintenance scheduling system of claim 1, wherein the rescheduling criteria is met when the machine usage data meets a set usage threshold.

9. The dynamic machine maintenance scheduling system of claim 8, wherein the set usage threshold is a threshold number of machine usage hours.

10. The dynamic machine maintenance scheduling system of claim 1, wherein the CDU also transmits machine error data to the offsite computer, wherein the one or more processors of the offsite computer are adapted to automatically reschedule an onsite machine service call at an earlier date if the machine error data shows that an urgent machine error has occurred.

11. The dynamic machine maintenance scheduling system of claim 10, wherein the one or more processors of the offsite computer are also adapted to use the machine error data to automatically generate machine repair instructions and/or to automatically order a machine replacement part.

12. The dynamic machine maintenance scheduling system of claim 1, wherein the one or more processors of the offsite computer are adapted to continue to prompt the CDU to transmit machine usage data until the offsite computer schedules an onsite service call date within a set time period.

13. The dynamic machine maintenance scheduling system of claim 1, wherein the previously scheduled onsite service call date is a date the offsite computer generated using machine identification data.

14. The dynamic machine maintenance scheduling system of claim 13, wherein the previously scheduled onsite service call date is a machine purchase anniversary date.

15. A dynamic machine maintenance scheduling system for a fleet of vehicles, comprising:

a plurality of mobile surface maintenance machines within the fleet of vehicles, each surface maintenance machine for maintaining surfaces at different locations, each surface maintenance machine supporting an engine control unit (ECU) and a central data unit (CDU) that are in data communication for transferring machine usage data from the ECU to the CDU, each CDU comprising one or more programmable processors;

an offsite computer at a location remote from the a plurality of surface maintenance machines, the offsite computer comprising one or more programmable processors;

wherein the one or more programmable processors of each CDU and the one or more programmable processors of the offsite computer are adapted to execute instructions to cause, on an automatic, recurring basis, at least one of
i. the offsite computer to prompt the CDUs to transmit the machine usage data associated with such CDU to the offsite computer, and
ii. each CDU to transmit the machine usage data of the floor treatment machine associated with such CDU to the offsite computer, the machine usage data corresponding to at least an amount of time of surface maintenance performed by the surface maintenance machine;

the offsite computer being adapted to determine whether the offsite computer has failed to receive machine usage data, when the offsite computer determines that it received machine usage data from a particular one the CDUs, the one or more processors of the offsite computer are adapted to automatically reschedule an onsite machine service call date for the surface treatment machine associated with the particular one of the CDUs when such machine usage data meets a rescheduling criteria or automatically keep a previously scheduled onsite machine service call date for the surface treatment machine associated with the particular one of the CDUs when such machine usage data fails to meet the rescheduling criteria; and when the offsite computer determines that it failed to receive machine usage data from the particular one of the CDUs, the one or more programmable processors of the offsite computer are adapted to automatically keep the previously scheduled onsite machine service call date for the surface treatment machine associated with the particular one of the CDUs.

16. The dynamic machine maintenance scheduling system of claim 15, wherein higher than expected machine usage occurs when a threshold increase occurs in average machine hours per week or per month and wherein lower than expected machine usage occurs when a threshold decrease occurs in average machine hours per week or per month.

17. The dynamic machine maintenance scheduling system of claim 15, wherein the one or more programmable processors of each CDU are also adapted to transmit machine error data to the offsite computer, wherein the one or more programmable processors of the offsite computer are adapted to automatically reschedule an onsite machine service call at an earlier date if the machine error data shows that an urgent machine error has occurred.

18. The dynamic machine maintenance scheduling system of claim 15, wherein the one or more programmable processors of the offsite computer are adapted to continue to prompt each CDU to transmit machine usage data until the offsite computer schedules an onsite service call date within a set time period.

19. The dynamic machine maintenance scheduling system of claim 15, wherein the previously scheduled onsite service call date is a date the offsite computer generated using machine identification data.

20. The dynamic machine maintenance scheduling system of claim 19, wherein the previously scheduled onsite service call date is a machine purchase anniversary date.

21. The dynamic machine maintenance scheduling system of claim 1, wherein the offsite computer is an offsite service center computer.

22. The dynamic machine maintenance scheduling system of claim 1, wherein the offsite computer is a mobile service unit computer.

23. The dynamic machine maintenance scheduling system of claim 1, wherein the offsite computer is located at an offsite service center.

24. The dynamic machine maintenance scheduling system of claim 1, wherein the offsite computer is comprised of at least one of one or more programmable processors, one or more memory modules, and one or more communication modules.

25. The dynamic machine maintenance scheduling system of claim 15, wherein the offsite computer is located at an offsite service center.

26. The dynamic machine maintenance scheduling system of claim 15, wherein the offsite computer is comprised of hardware implemented within separate devices.

* * * * *